(12) United States Patent
Blackburn

(10) Patent No.: US 7,588,265 B2
(45) Date of Patent: Sep. 15, 2009

(54) PRESSURIZED GAS RELEASE MECHANISM

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 547 days.

(21) Appl. No.: 11/104,042

(22) Filed: Apr. 11, 2005

(65) Prior Publication Data

US 2005/0223932 A1   Oct. 13, 2005

Related U.S. Application Data

(60) Provisional application No. 60/561,352, filed on Apr. 12, 2004, provisional application No. 60/561,353, filed on Apr. 12, 2004.

(51) Int. Cl.
*B60R 21/26* (2006.01)
(52) U.S. Cl. .............. 280/737; 280/740; 280/741; 280/742
(58) Field of Classification Search .......... 280/736, 280/737, 740, 741, 742
See application file for complete search history.

(56) References Cited

U.S. PATENT DOCUMENTS

| | | | | |
|---|---|---|---|---|
| 5,242,194 A | * | 9/1993 | Popek ........................ | 280/737 |
| 5,462,307 A | * | 10/1995 | Webber et al. .............. | 280/737 |
| 5,653,463 A | * | 8/1997 | Jeong ........................ | 280/737 |
| 5,711,547 A | * | 1/1998 | Blumenthal et al. ......... | 280/737 |
| 5,756,929 A | * | 5/1998 | Lundstrom et al. .......... | 149/22 |
| 5,872,329 A | * | 2/1999 | Burns et al. ................. | 149/36 |
| 6,068,292 A | * | 5/2000 | Renz ......................... | 280/737 |
| 6,077,371 A | * | 6/2000 | Lundstrom et al. .......... | 149/37 |
| 6,206,420 B1 | | 3/2001 | Skanborg et al. | |
| 6,210,505 B1 | | 4/2001 | Khandhadia et al. ........ | 149/36 |
| 6,231,079 B1 | * | 5/2001 | Perotto et al. .............. | 280/737 |
| 6,460,461 B2 | * | 10/2002 | Perotto et al. .............. | 102/288 |
| 6,755,439 B2 | | 6/2004 | Nanbu ....................... | 280/737 |
| 6,793,244 B1 | * | 9/2004 | Katsuda et al. ............. | 280/741 |
| 6,799,776 B2 | * | 10/2004 | Yamazaki ................... | 280/737 |
| 6,834,885 B2 | * | 12/2004 | Mizuno et al. .............. | 280/737 |
| 2002/0093182 A1 | | 7/2002 | Mizuno et al. .............. | 280/736 |

* cited by examiner

*Primary Examiner*—Toan C To
(74) *Attorney, Agent, or Firm*—L. C. Begin & Associates, PLLC

(57) ABSTRACT

A gas generating system including a mechanism (10) for releasing a pressurized fluid from a storage container (12). The mechanism (10) includes an enclosure (39) for receiving a gas from a gas source therein. An actuator (66) is slidably mounted in fluid communication with an interior of the enclosure (39) for initiating release of the fluid by a sliding motion of the actuator (66). The actuator (66) is slidable in response to a force exerted by a gas from the gas source received in the enclosure (39). A stop portion is coupled to the enclosure (39) for restricting sliding motion of the actuator (66). A seal (86) is provided for sealing the container (12). A penetrator portion is formed on the actuator (66) for opening the seal (86) to release the fluid from the container (12). A diffuser (34) is provided for receiving pressurized fluid from the container (12) upon opening of the seal (86). The diffuser (34) includes gas exit apertures (36) formed therealong to enable distribution of the pressurized fluid.

13 Claims, 2 Drawing Sheets

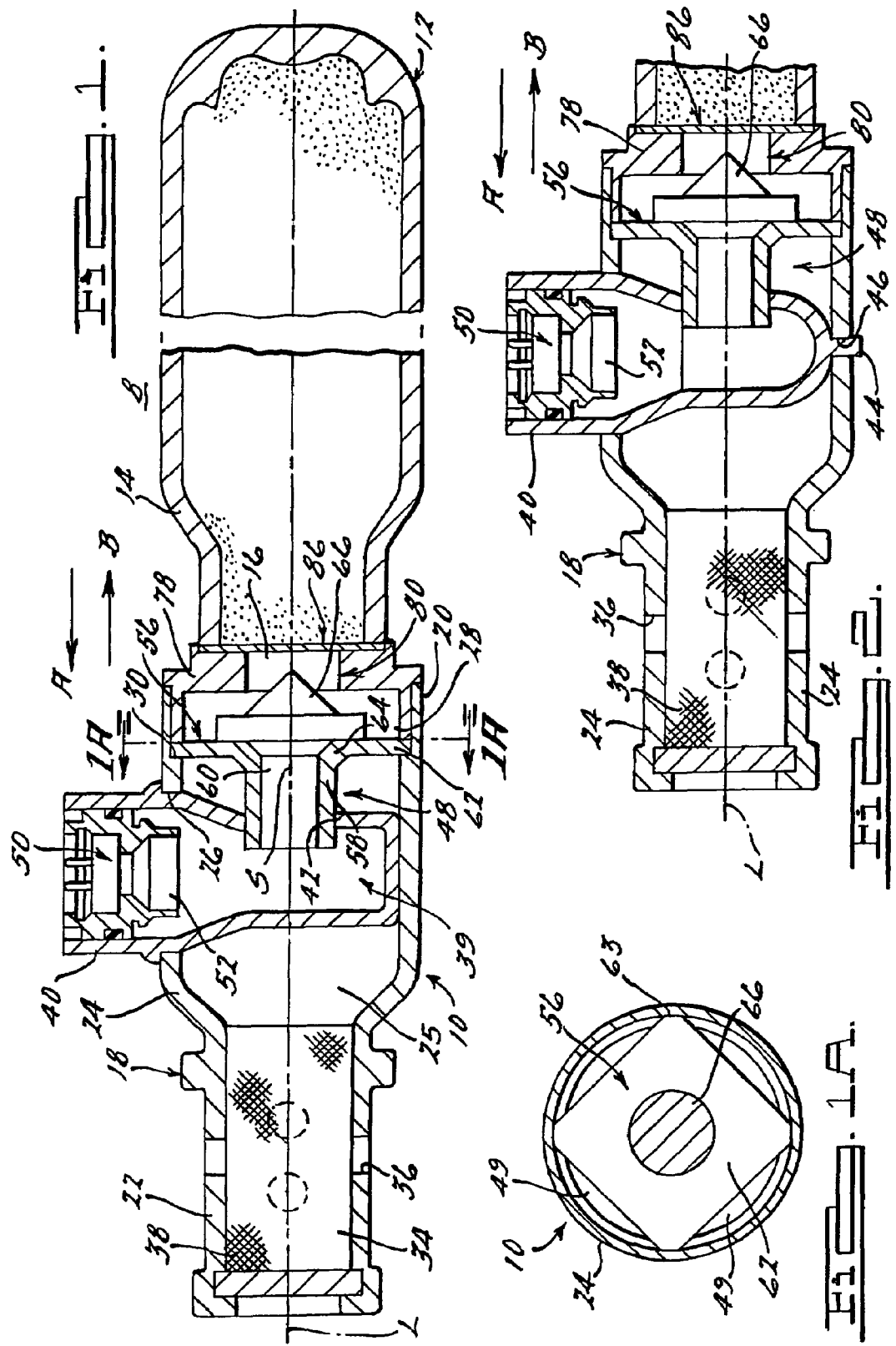

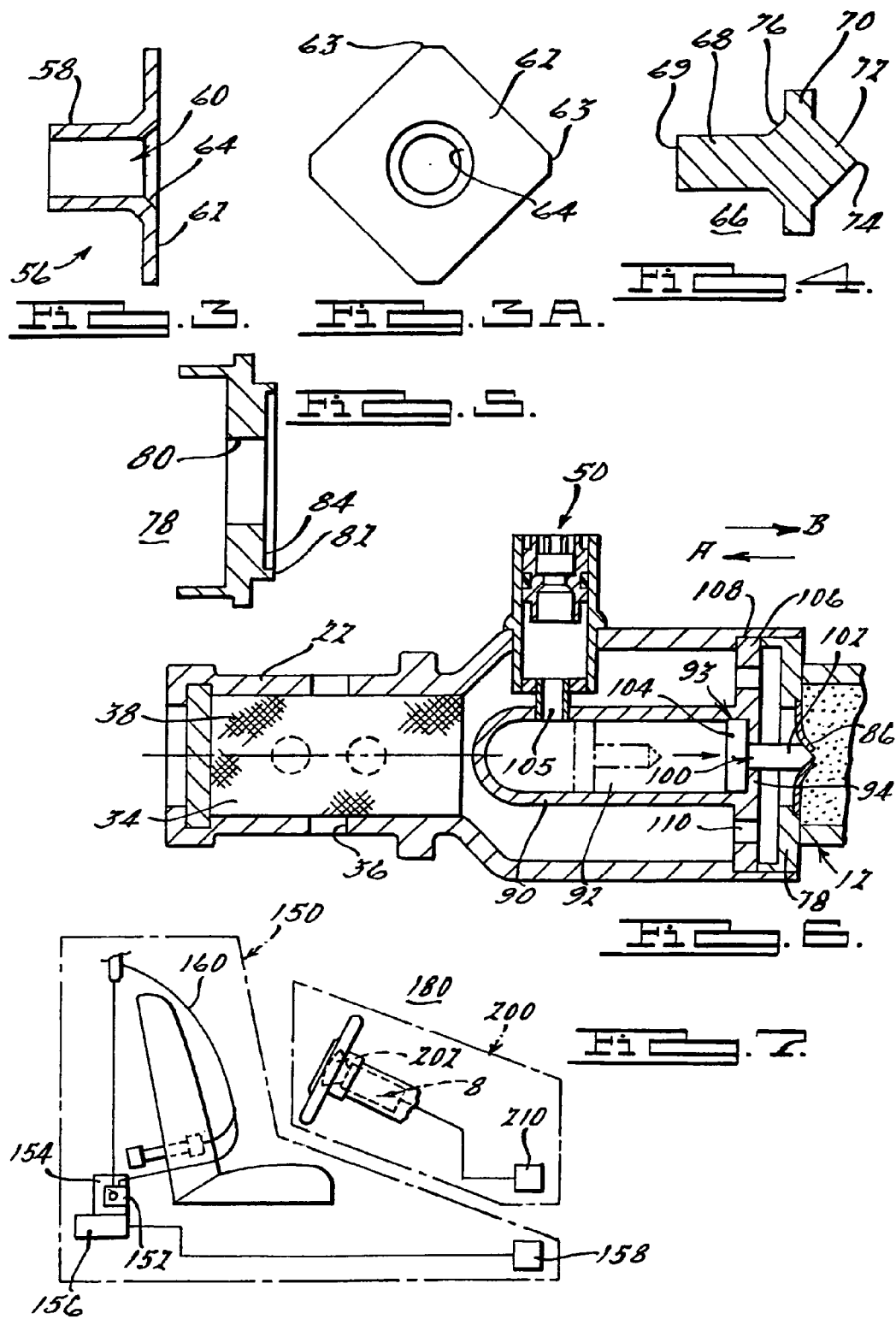

US 7,588,265 B2

PRESSURIZED GAS RELEASE MECHANISM

CROSS-REFERENCE TO RELATED APPLICATIONS

This application claims the benefit of U.S. Provisional Application Ser. Nos. 60/561,352 filed on Apr. 12, 2004 and 60/561,353 filed on Apr. 12, 2004.

BACKGROUND OF THE INVENTION

The present invention relates to inflators used to inflate an air bag in an automobile occupant protection system and, more particularly, to a mechanism for releasing a pressurized inflation fluid from a storage container, for use in inflating an airbag.

Inflation systems for deploying an air bag in a motor vehicle generally employ a gas generator in fluid communication with an uninflated air bag. The gas generator is typically triggered by a firing circuit when a sensor determines that vehicle acceleration has exceeded a predetermined threshold value (for example, through the use of an acceleration-responsive inertial switch.)

Air bag inflation systems often utilize a stored gas generator (or hybrid gas generator) housed within the B-pillar of a car, for example. Stored gas generators contain pressurized gas that is released to inflate the airbag upon receipt of a predetermined signal from the sensor. An ongoing challenge is to reduce the time required to release the stored gas upon a crash event. Furthermore, improved safety and reduced manufacturing costs are also ongoing concerns. Improvements in any of these areas would provide an advantage over state-of-the-art gas release systems.

Other stored gas release systems are known. For example, U.S. Pat. No. 6,206,420, herein incorporated by reference, describes a device for the introduction of pressurized gas into an airbag.

SUMMARY OF THE INVENTION

A mechanism for releasing a pressurized fluid from a storage container is provided. The mechanism includes an enclosure for receiving a second pressurized fluid therein, from a pyrotechnic source for example. An actuator is slidably mounted in fluid communication with an interior of the enclosure for initiating release of the first pressurized fluid by a sliding motion of the actuator. The actuator is slidable in response to a force exerted thereon by the second pressurized fluid in the enclosure. Means are also provided for restricting sliding motion of the actuator.

Also disclosed is an inflator for use in a vehicle occupant protection system. The inflator includes a container for storing a first pressurized fluid therein. A seal is provided for sealing the container to retain the first pressurized fluid within the container. Means are also provided for opening the seal to release the first pressurized fluid from the container. The opening means include an enclosure for receiving a second pressurized fluid therein, and an actuator is slidably mounted in fluid communication with an interior of the enclosure for opening the seal through sliding motion of the actuator. The actuator is slidable in response to a force exerted by the second pressurized fluid in the enclosure. Means are also coupled to the enclosure for restricting sliding motion of the actuator. A diffuser is provided for receiving pressurized fluid from the container upon opening of the seal. The diffuser includes gas exit apertures formed therealong to enable distribution of the pressurized fluid.

BRIEF DESCRIPTION OF THE DRAWINGS

In the drawings illustrating embodiments of the present invention:

FIG. 1 is a cross-sectional view of an inflator incorporating a mechanism for releasing a pressurized fluid from a storage container, in accordance with the present invention;

FIG. 1A is an end view of a portion of the inflator shown in FIG. 1;

FIG. 2 is a cross-sectional view of an alternative embodiment of the mechanism shown in FIG. 1;

FIG. 3 is a cross-sectional side view of a barrel used in the mechanism of the present invention;

FIG. 3A is an end view of the barrel shown in FIG. 3;

FIG. 4 is a cross-sectional view of an actuator used in the mechanism of the present invention;

FIG. 5 is a cross-sectional view of a support member used in the mechanism of the present invention;

FIG. 6 is a cross-sectional view of another alternative embodiment of the mechanism shown in FIG. 1; and FIG. 7 is a schematic view of an airbag system and a vehicle occupant restraint system incorporating an inflator using the pressurized fluid containment mechanism of the present invention.

DETAILED DESCRIPTION

FIG. 1 shows one exemplary embodiment of a gas generating system incorporating a mechanism 10 for releasing a pressurized inflation fluid from a storage container 12, in accordance with the present invention. In the embodiments shown in FIGS. 1-7, the gas generating system is in the form of a gas generator or inflator incorporated into a vehicle occupant protection system. However, the gas generating system described herein may be incorporated into any one of a variety of alternative devices requiring a gas generating system.

Referring to FIGS. 1-3, mechanism 10 is shown secured to a storage container 12 (in the embodiment shown, a gas bottle or tank) in which a pressurized fluid (in this case, an inflation gas) is stored. Storage container 12 has an annular wall 14 defining an opening 16. Mechanism 10 includes a housing 18 having a first end 20, a second end 22, and a wall 24 defining a passage 25 for passage of a pressurized inflation fluid therethrough upon activation of the inflator. A longitudinal axis L extends longitudinally and centrally through housing 18. An opening 26 is formed in wall 24 intermediate first end 20 and second end 22, for receiving therein a portion of an enclosure 39 (described in greater detail below.) In the embodiment shown in FIG. 1, wall 24 also defines an opening 28 facing storage container 12, with an annular shoulder 30 preferably extending from the wall.

In the embodiment shown in FIG. 1, housing 18 also preferably contains a hollow diffuser portion 34 formed proximate housing second end 22. Diffuser portion 34 may be formed integrally with housing 18. Alternatively, diffuser portion 34 may be machined or otherwise formed from steel or other suitable materials, and then welded or otherwise fixed to housing second end 22. Diffuser 34 functions to distribute gas flowing from first end 20 through passage 25 and out housing second end 22. A plurality of gas discharge orifices 36 is preferably spaced about a circumference of the diffuser. The embodiment shown in FIG. 1 includes four gas discharge orifices 36 substantially evenly spaced about the circumference of the diffuser. The diffuser may incorporate a filter 38 therein to filter combustion products from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.)

Housing 18 may be cast, machined or otherwise formed from steel or other suitable metals or metal alloys. Alternatively, housing 18 may be molded from a suitable polymer material. In addition, housing 18 may be fabricated from component pieces which are formed individually and then suitably secured to each other, for example, by welding.

Referring again to FIG. 1, an enclosure 39 is provided for receiving and containing therein a gas or pressurized fluid emanating from a gas generator or pressurized fluid source, and also for slidingly receiving an actuator 66 (described in greater detail below) therein used for initiating release of the pressurized fluid in container 12 by a sliding motion of the actuator 66. In the embodiment shown in FIG. 1, enclosure 39 is defined by a generally tubular shell 40 and a barrel 56 coupled to shell 40 such that an interior of shell 40 is in fluid communication with an interior of barrel 56. In the embodiment of FIG. 1, barrel 56 is positioned and secured within an annulus or opening 42 formed in shell 40 by welding, press-fitting, or other suitable means. Alternatively, barrel 56 may be physically separated from shell 40 as long as the interior of shell 40 is in fluid communication with the interior of barrel 56.

In the embodiment shown in FIG. 1, shell 40 is preferably oriented substantially orthogonal to housing longitudinal axis L, extending within housing 18 and being welded or otherwise suitably secured in place. Also in the embodiment shown in FIG. 1, opening 42 is preferably formed within the shell such that an axis S extending perpendicular to the opening and centrally therethrough is parallel or co-linear with axis L extending longitudinally and centrally through housing 18. Opening 42 is oriented to face housing first end 20. Shell 40 may be drawn or otherwise formed from a suitable metal or metal alloy. A flange or collar 41 is welded or otherwise fixed upon an outer wall 43 of housing 18 thereby securing the shell 40 within the housing 18.

In an alternative embodiment, shown in FIG. 2, housing 18 and shell 40 include complementary positioning features to facilitate proper positioning and securing of shell 40 within housing 18. In the embodiment shown in FIG. 2, the positioning features comprise a nipple 44 formed at an end of shell 40 and a complementary hole 46 formed in housing wall 24 for receiving dimple 44 therein. Upon placement within hole 46, nipple 44 can be flattened or otherwise flanged against the outer portion of housing wall 18, thereby fixing shell 40 in place instead of welding the same. In essence, a fastener similar to a rivet is formed during the stamping or metal forming process to facilitate proper positioning of shell 40 relative to housing 18 and ease of assembly. Alternatively, nipple 44 and hole 46 may be size such that an interference fit is formed when the nipple is inserted into the hole.

Referring to FIGS. 1 and 3, a barrel 56 is provided for positioning and guiding a slidable actuator 66 (described in greater detail below), movement of which releases the inflation fluid from storage container 12 upon activation of the inflator. Barrel 56 includes a sleeve member 58 defining an annular orifice 60, and a flange 62 extending radially from the sleeve member. Sleeve member 58 is preferably fixed within (and substantially coaxially with) shell opening 42, enabling orifice 60 to provide fluid communication between the interior of shell 40 and an interior of sleeve member 58. Flange 62 is joined to sleeve member 58 by a chamfered section 64. Flange 62 is preferably machined or stamped to form an outer rectangular or square perimeter having a plurality of corners 63 (FIG. 1A). Alternatively, a multilateral perimeter (not shown) having as many outer edges as desired may be formed.

As seen in FIGS. 1, 1A, 2, and 3, when shell 40 is secured in housing 18, a cavity 48 is formed between storage container 12 and shell 40. Flange 62 (FIG. 3) is positioned within cavity 48 and is seated against housing shoulder 30 at corners 63, thereby providing four separate apertures 49 between the outer edges of flange 62 and wall 24 of housing 18 (FIG. 1A), thereby facilitating fluid communication between opposite sides of the flange upon inflator activation.

Barrel 56 may be extruded and finished machined from a suitable metal or metal alloy. Alternatively, flange 62 may be formed separate from sleeve member 58 and may be attached to sleeve member using a suitable method, such as welding.

A gas source 50 from a pyrotechnic or pressurized fluid source is coupled to enclosure 39 for providing a pressurized fluid to the interior of the enclosure upon activation of the inflator. In one embodiment, shown in FIGS. 1 and 2, the pressurized fluid source preferably comprises a micro gas generator 50 coupled to enclosure 39 so as to be in communication with an interior of the enclosure. In the embodiment shown in FIG. 1, gas generator 50 is secured within enclosure 39. Gas generator 50 is preferably crimped or otherwise suitably secured within enclosure 39 so that, upon activation of gas generator 50, the gas generator is in fluid communication with the interior of enclosure 39. The structural elements of micro gas generator 50 are manufactured by means known in the art. U.S. Pat. Nos. 5,397,075 and 5,899,399, incorporated herein by reference, are instructional and disclose examples of typical micro gas generator construction. Alternatively, other sources positioned either within or external to enclosure 39 may be used to provide pressurized fluid to the enclosure. For example, a conduit (not shown) may be used to convey pressurized fluid from a remotely located source to enclosure 39.

An igniter 52 is preferably contained within gas generator 50 and ignitably communicates with a gas generant (not shown) also contained within generator 50. In the embodiment shown in FIG. 1, igniter 52 is positioned within an annular bore of shell 40. Igniter 52 may be formed as known in the art. One exemplary igniter construction is described in U.S. Pat. No. 6,009,809, herein incorporated by reference.

The gas generant in gas generator 50 may comprise any gas generant composition known for its utility in vehicle occupant protection systems. Co-owned U.S. Pat. Nos. 5,035,757, 5,756,929, 5,872,329, 6,077,371, 6,074,502, and 6,210,505 are incorporated herein by reference and exemplify, but do not limit gas generant compositions contemplated in accordance with the present invention.

In one embodiment, the gas generant comprises a mixture of silicone as a fuel at about 10-25% by weight, and an oxidizer such as ammonium or potassium perchlorate at about 75-90% by weight. Silicone not only functions as a fuel but also functions as a binder thereby facilitating the formation of pliant cylindrical gas generant extrusions. In a particular embodiment, the gas generant comprises silicone as a fuel at about 10-25% by weight; a perchlorate oxidizer such as ammonium, lithium, or potassium perchlorate; and a strontium salt such as strontium nitrate or strontium carbonate as a coolant, wherein the oxidizer and coolant comprise about 75-90% by weight of the gas generant. The silicone may be purchased, for example, from General Electric or other well-known suppliers. The other gas generant constituents may be provided by suppliers or by manufacturing methods well known in the art.

The gas generant composition yet more preferably comprises, in percents by weight, 10-25% silicone, 75-90% oxidizer, 1-30% coolant, and 1-20% of a slag-forming constituent. The oxidizer may for example be selected from inorganic perchlorates and nitrates such as sodium perchlorate, potassium perchlorate, ammonium perchlorate, potassium nitrate, ammonium nitrate, and phase stabilized ammonium nitrate. The coolant may for example be selected from metal hydroxides such as aluminum hydroxide; metal carbonates such as calcium carbonate, magnesium carbonate, strontium carbonate, and sodium carbonate; and inorganic oxalates such as calcium oxalate, strontium oxalate, and ammonium oxalate. The slag-forming constituent may for example be selected from metal oxides such as aluminum oxide and iron oxide. It has been found that gas generating compositions containing silicone and a perchlorate oxidizer burn at relatively lower temperatures when a coolant, in accordance with the present invention, is added to the mixture. As a result, cooling requirements of gas generated within the gas release mechanism 10 can be substantially minimized.

Referring to FIGS. 1, 2, and 4, a movable actuator 66 is provided for initiating release of the inflation fluid stored in bottle 12 upon activation of the inflator. In the embodiment shown in FIGS. 1, 2, and 4, actuator 66 includes a longitudinal shaft portion 68, a shoulder 70 extending radially outwardly from shaft portion 68, and a penetrator portion 72 extending longitudinally from shoulder 70. Shaft portion 68 is preferably slidably received within barrel sleeve member 58. Shoulder 70 is preferably joined to actuator shaft portion 68 by a chamfered fillet 76 generally conforming to the contour of barrel chamfered section 64. Penetrator portion 72 is preferably generally conical and terminates at a pointed end 74 facing bottle 18 when the actuator is mounted in sleeve member 58.

Prior to inflator activation, actuator shoulder 70 preferably abuts barrel flange 62 as shown in FIGS. 1 and 2. Shoulder 70 is also preferably dimensioned so as to abut a portion of barrel 56 when the actuator moves in a direction indicated by arrow "A", thereby forming a stop portion to limit sliding motion of the actuator in direction "A". In addition, when actuator shaft portion 68 is slidably received within barrel sleeve member 58, an end 69 of the shaft portion is in fluid communication with the interior of enclosure 39.

Referring to FIGS. 1, 2, and 5, a support member 78 is preferably fixed at first end 20 of housing 18 for supporting a portion of a seal 86 (described in greater detail below) against pressure exerted by inflation fluid stored in bottle 12. Support member 78 contains an opening 80 in coaxial relation with the sleeve member annular orifice 60 to enable fluid communication between the interior of bottle 12 and the interior of housing 18 upon activation of the inflator. Opening 80 is preferably sized to receive a part of actuator penetrator portion 72 (FIG. 4) therein when actuator 66 slides within sleeve member 58 in the direction indicated by arrow "B". Opening 80 is also preferably sized such that an edge of opening 80 abuts actuator shoulder 70 when the actuator has moved a predetermined distance in direction "B", thereby restricting sliding motion of actuator 66 in direction "B". An end face 82 of support member 78 includes an annular ledge 84 for receiving seal 86 therein, in a manner described in greater detail below.

As seen in FIGS. 1, 2, and 3, barrel flange 62 is positioned between housing shoulder 30 and support member 78 when barrel 56 and support member 78 are affixed to the housing. During activation of the inflator, actuator 66 slides within sleeve member 58 in directions "A" and "B", within the limits to motion provided by abutment of actuator shoulder 70 (FIG. 4) with barrel flange 62 and abutment of actuator shoulder 70 with the edge of support member opening 80.

Referring again to FIGS. 1 and 2, a rupturable seal 86 (for example, a burst disk) is secured in fluid communication with an interior of bottle 12. Seal 86 forms a fluid-tight barrier preventing flow of pressurized gas through or around the seal. In the embodiment shown in FIGS. 1 and 2, seal 86 is preferably seated along support member ledge 84 and welded or otherwise secured thereon to obstruct flow of the pressurized fluid during normal vehicular operation. In an alternative embodiment (not shown), seal 86 is seated along and secured to an annular ledge formed along opening 16 of bottle 12.

Seal 86 is designed to obstruct flow of the pressurized fluid when externally supported against pressure exerted by the fluid by support member 78. Seal 86 is also designed to be rupturable by penetrator portion 72 of actuator 66 contacting the seal upon activation of the inflator, in a manner also described in detail below. When support member 78 is buttressed against seal 86, the support member supports seal 86 against pressure exerted by pressurized gas in bottle 12, thereby preventing pressurized fluid in bottle 12 from rupturing seal 86 during normal vehicular operation.

Seal 86 may be stamped or formed from any of a variety of gas or fluid impermeable materials, as is known in the art. Exemplary materials include aluminum, steel, tin and non-metal seals. The materials and structure of the seal will depend on the pressure of the fluid sealed in bottle 12 and the desired performance characteristics of inflator 8. For example, seals made from materials and/or having structures which are relatively more or less readily ruptured may be used.

Unless stated otherwise, the various structural constituents described above are formed by methods known in the art. For example, housing 18, enclosure 39, actuator 66, barrel 56, support member 78, and storage container 12 may all be manufactured by stamping, die casting, or other metal forming methods. Different metals such as carbon steel, stainless steel, aluminum and various metallic alloys are all contemplated as useful when forming these parts.

Operation of mechanism 10 will now be discussed.

In the embodiments shown in FIGS. 1 and 2, release of the inflation fluid stored in bottle 12 is initiated by sliding motion of actuator 66 resulting in penetration of seal 86 by penetrator portion 72. Upon a crash event, igniter 52 receives a signal from a crash sensor or accelerometer (not shown), for example, producing ignition of the gas generant in micro gas generator 50. Heat and combustion gases produced by ignition of the gas generant expand into enclosure 39 and impinge on actuator end 69, forcing actuator 66 to slide within sleeve member 58 in direction B. As actuator 66 proceeds in direction B, penetrator portion 72 proceeds through support member opening 80 to puncture seal 86, thereby releasing fluid from bottle 12. As actuator shoulder 70 is sized to prevent passage of the shoulder through support member opening 80, contact between shoulder 70 and the edge of opening 80 limits movement of the actuator in direction B. The resultant pressurized fluid flow emanating from container 12 drives actuator 66 back from support member opening 80, thereby permitting passage of the inflation fluid through opening 80, through apertures 49 formed between barrel flange 62 and housing 18 (FIG. 1A), along the housing interior to housing second end 22 and out through diffuser discharge orifices 36 to inflate an airbag (not shown). It will be appreciated that the above-referenced inflator may be utilized in any protective device such as an airbag system now known or contemplated into the future. Or, alternatively, the device may be characterized as a gas generating device useful wherever a source of gas is required.

FIG. 6 shows another alternative embodiment of the pressurized gas release mechanism. Enclosure 90 has a longitudinal opening 92 extending therealong with an open end 93 facing support member 78. A lip 94 is formed along an edge of opening end 93. A passage 105 is provided to enable fluid communication between an interior of enclosure 90 and a gas generator 50 upon activation of the inflator. An actuator 100 is slidingly received in opening 92. Actuator 100 has a penetrator portion 102 at an end of the actuator facing support member 78, and a ledge portion 104 formed at an opposite end of the actuator. A flange 106 extends radially outwardly from a circumference of opening 92 to abut housing wall 22 along substantially an entire outer edge 108 of the flange. A plurality of gas flow apertures 110 are formed in flange 106 to enable fluid communication between a side of flange 106 on which container 12 is positioned and a side of the flange on which gas generator 50 is positioned.

Operation of the embodiment shown in FIG. 6 is basically the same as for the embodiments previously described. As pressurized fluid enters enclosure 90, actuator 100 is forced in direction B. When the actuator reaches opening end 93, penetrator portion 102 punctures seal 86 while ledge 104 contacts opening lip 94, thereby preventing further movement of actuator 100 in direction B. Pressurized inflation fluid flow out of container 12 proceeds substantially as previously described, through gas flow apertures 110, along the housing interior to housing second end 22 and out through diffuser discharge orifices 36 to inflate an airbag (not shown)

Referring to FIG. 7, any embodiment of the inflator described herein may be incorporated into a gas generating system as exemplified by an airbag system 200. Airbag system 200 includes at least one airbag 202 and an inflator 8 coupled to airbag 202 so as to enable fluid communication with an interior of the airbag. Airbag system 200 may also be in communication with any known crash event sensor 210 in operative communication with a known crash sensor algorithm that signals actuation of airbag system 200 via, for example, activation of gas generator igniter 52 (not shown in FIG. 7) in the event of a collision.

Referring again to FIG. 7, an embodiment of the inflator or an airbag system including an embodiment of the inflator may be incorporated into a broader, more comprehensive vehicle occupant restraint system 180 including additional elements such as a safety belt assembly, as seen in FIG. 7. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Another gas generating system is exemplified by safety belt system 150 that is typically in communication with a known crash event sensor 158 (for example, an inertia sensor or an accelerometer) in operative communication with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
  a mechanism for releasing a fluid from a storage container, the mechanism comprising—
  a movable actuator positioned so as to enable fluid communication with a gas source after activation of the gas source;
  an enclosure defining a flow path for a gas from the gas source, the enclosure including a stop portion for limiting movement of the actuator; and
  a flange extending radially outwardly along a portion of the enclosure, the flange including at least one orifice formed therealong to enable fluid communication between a first side of the flange and a second side of the flange.

2. The gas generating system of claim 1 wherein the actuator is slidingly received in the enclosure, the actuator being slidable in response to a force exerted thereon by a gas from the gas source.

3. The gas generating system of claim 1 wherein the enclosure includes an opening formed therein, and the stop portion comprises an edge portion of the opening adapted for engaging a surface on the actuator.

4. The gas generating system of claim 3 wherein the actuator includes a shoulder formed along a surface thereof, the enclosure includes a barrel defining an annular orifice for slidingly receiving the actuator therein; and the stop portion comprises a portion of the barrel adapted for engaging the shoulder of the actuator.

5. The gas generating system of claim 1 further comprising a housing operatively coupled to the enclosure, the housing defining a cavity, and wherein the flange is positioned within the cavity and coupled to the housing such that at the least one orifice is positioned between the flange and the housing.

6. The gas generating system of claim 1 wherein the gas source comprises a micro gas generator.

7. The gas generating system of claim 6 wherein the micro gas generator is positioned within the enclosure.

8. The gas generating system of claim 6 wherein the micro gas generator comprises a gas generant composition including a mixture of silicone at about 10-25% by weight, and an oxidizer selected from the group consisting of ammonium and potassium perchlorate at about 75-90% by weight of the gas generant composition.

9. The gas generating system of claim 8 wherein the gas generant composition comprises silicone at about 10-25% by weight; a perchlorate oxidizer selected from the group consisting of ammonium, lithium, and potassium perchlorate; and a strontium salt selected from the group consisting of strontium nitrate and strontium carbonate as a coolant wherein the oxidizer and coolant comprise about 75-90% by weight of the gas generant composition.

10. The gas generating system of claim 9 wherein the gas generant composition comprises:
- silicone at 10-25%;
- an oxidizer selected from the group consisting of inorganic perchlorates and nitrates at 75-90%,
- a coolant selected from the group consisting of metal hydroxides, metal carbonates, and inorganic oxalates at 1-30%; and
- a slag-forming constituent selected from the group consisting of metal oxides at 1-20%.

11. The gas generating system of claim 1 further comprising a support member operatively coupled to the enclosure, a penetrator portion formed on the actuator, and an opening formed in the support member for receiving the penetrator portion therein during motion of the actuator.

12. The gas generating system of claim 11 further comprising a seal positioned over the support member opening to cover an opening in the container, for sealing the container to retain the fluid within the container, the seal being penetrable by the actuator penetrator portion during motion of the actuator.

13. The gas generating system of claim 12 a diffuser portion defining a cavity for receiving fluid from the container upon opening of the seal, the diffuser portion including at least one gas exit aperture formed therealong to enable fluid communication between the cavity and an exterior of the diffuser portion.

* * * * *